United States Patent
D'Agostini

(10) Patent No.: US 7,390,189 B2
(45) Date of Patent: Jun. 24, 2008

(54) BURNER AND METHOD FOR COMBUSTING FUELS

(75) Inventor: Mark Daniel D'Agostini, Hazleton, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 31 days.

(21) Appl. No.: 10/919,940

(22) Filed: Aug. 16, 2004

(65) Prior Publication Data

US 2006/0035184 A1    Feb. 16, 2006

(51) Int. Cl.
  *F23M 3/04*    (2006.01)
  *F23C 7/00*    (2006.01)
(52) U.S. Cl. .......................... 431/10; 431/187
(58) Field of Classification Search ............ 431/10, 431/187; 239/423
  See application file for complete search history.

(56) References Cited

U.S. PATENT DOCUMENTS

| | | | |
|---|---|---|---|
| 4,690,635 A | 9/1987 | Coppin | |
| 5,199,866 A | 4/1993 | Joshi et al. | |
| 5,360,171 A | 11/1994 | Yap | |
| 5,390,857 A | 2/1995 | Primdahl | |
| 5,431,559 A | 7/1995 | Taylor | |
| 5,439,373 A | 8/1995 | Anderson et al. | |
| 5,458,483 A | 10/1995 | Taylor | |
| 5,545,031 A | 8/1996 | Joshi et al. | |
| 5,567,141 A * | 10/1996 | Joshi et al. ............... | 431/8 |
| 5,575,637 A | 11/1996 | Slavejkov et al. | |
| 5,611,682 A | 3/1997 | Slavejkov et al. | |
| 5,785,721 A | 7/1998 | Brooker | |
| 5,924,858 A | 7/1999 | Tuson et al. | |
| 6,210,151 B1 | 4/2001 | Joshi et al. | |
| 6,332,340 B1 | 12/2001 | Bodelin et al. | |

FOREIGN PATENT DOCUMENTS

| | | |
|---|---|---|
| DE | 100 45 320 | 3/2002 |
| EP | 0 563 793 | 10/1993 |
| EP | 0 582 521 | 2/1994 |
| JP | 6-101820 A | 4/1994 |
| JP | 2001-201018 A | 7/2001 |

* cited by examiner

*Primary Examiner*—Alfred Basichas
(74) *Attorney, Agent, or Firm*—James J. Kozuch; Anne B. Kiernan

(57) ABSTRACT

A burner includes separate fuel and oxidant conduits. The fuel conduit has inlet, transitional, and outlet sections, and the oxidant conduit has inlet and outlet sections. The cross sectional flow area of the fuel transitional section varies from an initial cross sectional flow area at the fuel intake to a different cross sectional flow area at the fuel outtake, and the cross sectional flow area of the fuel outlet section is substantially uniform. At least some of the oxidant inlet section is spaced around substantially all of at least a portion of at least one of the fuel inlet, transitional, and outlet sections. The cross sectional flow area of the oxidant outlet section is less than or equal to the cross sectional flow area of the oxidant inlet section and is substantially uniform, and at least some of it is spaced around substantially all of at least a portion of the fuel outlet section.

28 Claims, 13 Drawing Sheets

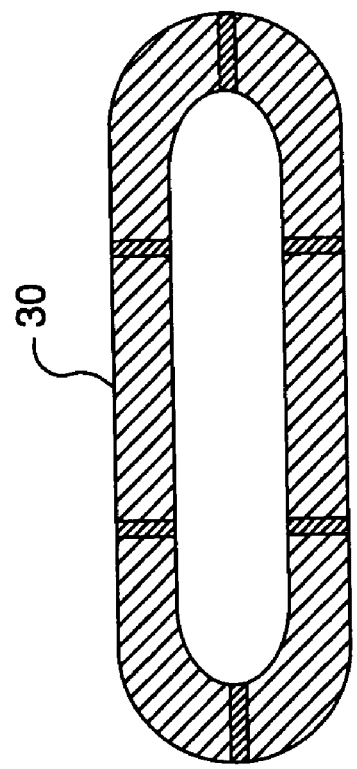
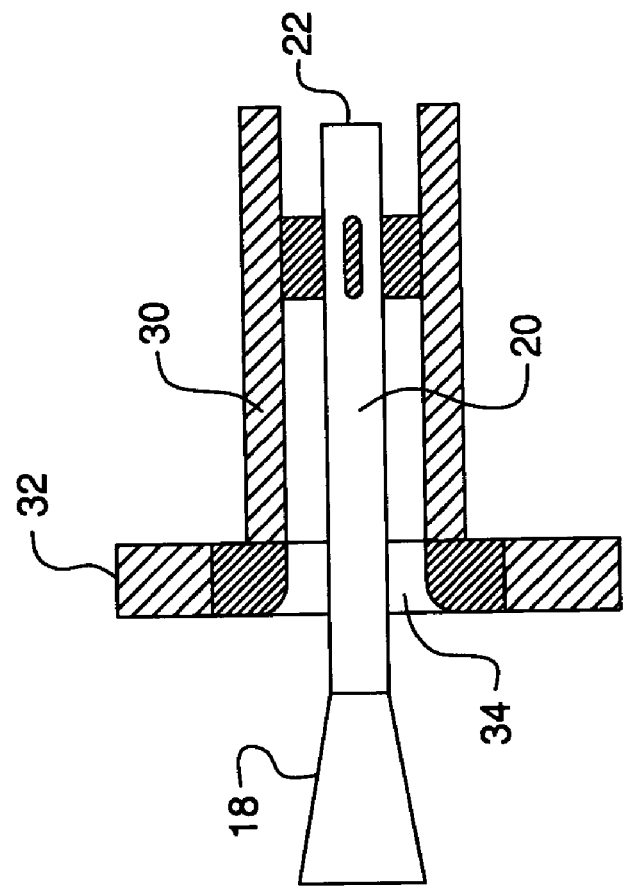
Figure 2
Figure 3

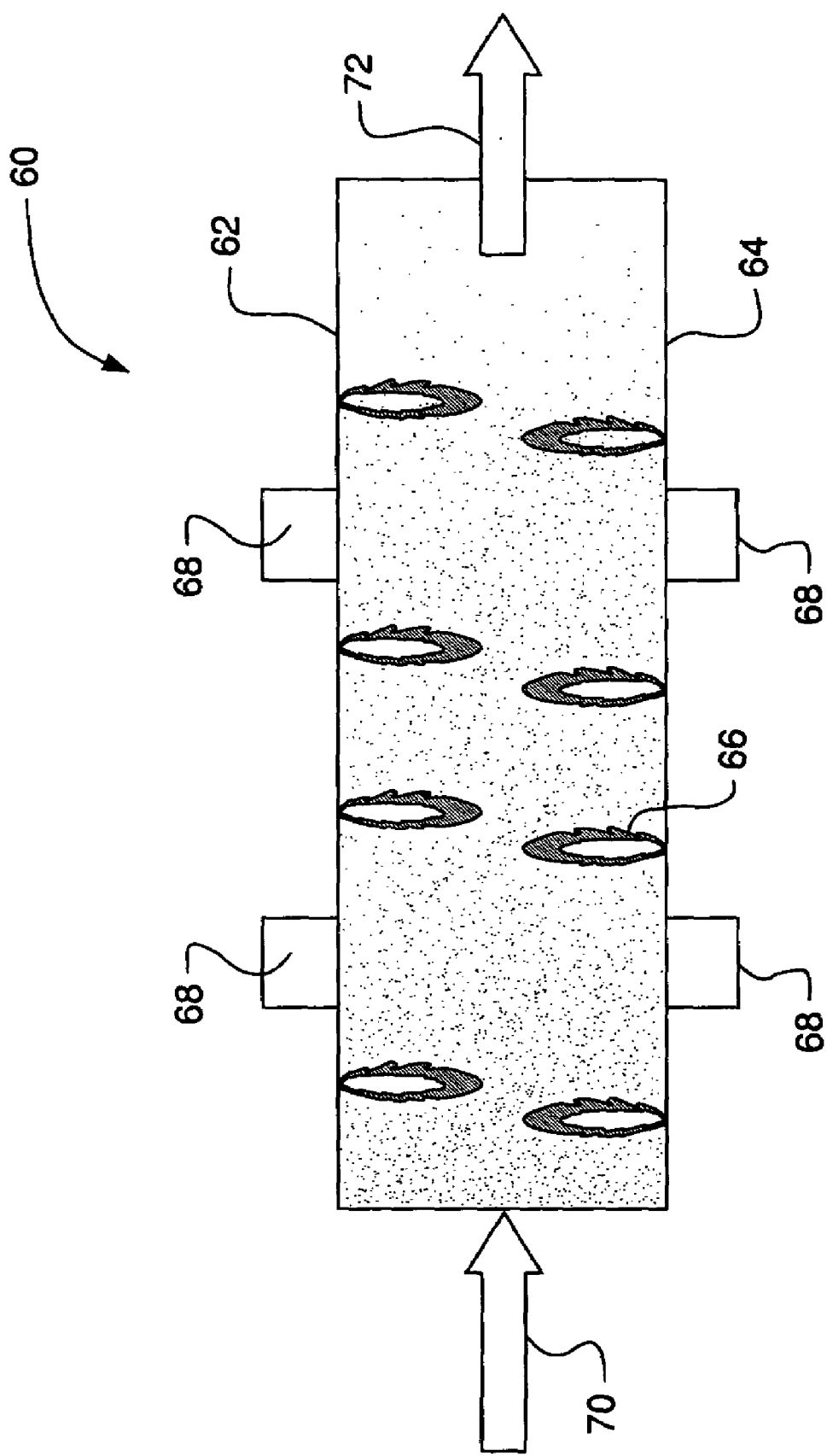

BURNER AND METHOD FOR COMBUSTING FUELS

BACKGROUND OF THE INVENTION

The present invention relates to fuel burners and methods for combusting gaseous fuels with oxidants, such as oxygen or oxygen enriched air, and in particular to such burners and methods for producing elevated temperatures in industrial melting furnaces for glass, ceramic materials, metals, etc.

Although the invention is discussed within the context of oxy/gas burners and methods of combustion for glass melting, the invention is not limited to use with glass melting or industrial melting furnaces. Persons skilled in the art will recognize that the burner and method of the present invention may be used in many other fired process heating applications.

U.S. Pat. No. 5,360,171 (Yap) discloses a burner for burning fuel in an oxidant having a fuel nozzle sandwiched between upper and lower oxidant nozzles, which are separate and distinct from one another. The burner produces fuel and oxidant jets of an outwardly divergent, fan-shaped configuration to provide a wide flame. The oxidant jets have a lower velocity than the fuel jets such that the oxidant is aspirated into the fuel. Upper and lower secondary oxidant nozzles can be provided for staged combustion.

U.S. Pat. No. 5,545,031 (Joshi, et al.) discloses a method and apparatus for discharging fuel and oxidant from a nozzle in a fashion that forms a fishtail or fan-shaped flame. In a preferred embodiment, a fuel manifold is positioned within an oxidant manifold. Both the fuel manifold and the oxidant manifold preferably have a rectangular cross section at an exit plane. In one preferred embodiment, both of the manifolds have a generally square-shaped cross section in an upstream location, which converges in a generally vertical direction and diverges in a generally horizontal direction to form the generally rectangular cross section at the exit plane. The combined converging and diverging effect produces a net momentum transfer of the fluid from a generally vertical plane to a generally horizontal plane so that the fuel and oxidant are discharged from the nozzle in a relatively wide fashion which produces the fishtail or fan-shaped flame configuration.

U.S. Pat. No. 5,611,682 (Slavejkov, et al.) discloses a staged oxy-fuel burner for producing a generally flat fuel-rich flame overlying a highly radiative fuel-lean flame. The burner has a fuel passage terminating in a nozzle, a housing surrounding the fuel passage with a space between the housing and the fuel passage, the space forming an oxidizer passage. When fuel is introduced into the fuel passage and an oxidizer is introduced into the oxidizer passage, a generally flat fuel-rich flame is produced at the nozzle end of the fuel conduit. A staging nozzle is also provided for introducing a portion of the oxidizer underneath the fuel-rich flame, which is entrained into the underside of the fuel-rich flame to produce a highly radiative fuel-lean flame.

U.S. Pat. No. 5,575,637 (Slavejkov, et al.) discloses an oxy-fuel burner similar to that in U.S. Pat. No. 5,611,682 (Slavejkov, et al.), except that this burner does not include a passage for a staging oxidizer and does not utilize staging.

U.S. Pat. No. 4,690,635 (Coppin) discloses a high-temperature burner assembly having an oxygen-containing nozzle body which has a gas conduit insert disposed therein. The gas conduit insert includes a gas conduit insert tip having a substantially flat exterior tip face with a frusto-conical shaped prominence disposed thereon and protruding from the tip face. The gas conduit insert tip includes a centrally disposed gas channel terminating at the proximal end of the frusto-conical shaped prominence to form a knife edge. An oxygen expelling orifice is concentrically disposed about the frusto-conical shaped prominence for directing oxygen therefrom to mix with the gaseous fuel for combustion within a refractory burner block.

Despite the advances made by the various designs of prior art burners, many problems still exist, including but not limited to:

reactant flow non-uniformity leading to non-uniformity in flame properties;

high levels of turbulence in the reactant streams leading to higher than desired rates of mixing and combustion;

accumulation and growth of solid carbon on the fuel nozzle tip leading to flame distortion.

These performance related problems frequently lead to burner and process related problems, such as:

Hotter, shorter flames that result in mal-distribution of heat transfer and temperature within the process furnace. Such effects generally shorten furnace refractory life and reduce product yield.

Limitations in the percentage of oxidant that can be diverted (staged) away from the primary fuel/oxidant mixture. This limitation occurs in burners that discharge a portion of the fuel and oxidizer into a refractory burner block (sometimes referred to as a precombustor) that separates the burner assembly from the process furnace. The principal consequences of this limitation are lower rates of radiant heat transfer, lower fuel efficiency and higher NOx emissions.

Premature high-temperature failure of burner components.

Limited range of burner firing rate (fuel flow rate).

In view of these and many other problems pertaining to prior art burners and methods for combustion, it is desired to have a burner and a method for combustion which overcome the difficulties, problems, limitations, disadvantages, and deficiencies of the prior art to provide better and more advantageous results.

It is further desired to have a more efficient burner and method of combustion for combusting a fuel with an oxidant.

It is still further desired to reduce the non-uniformity of velocities in fuel and oxidant streams at the point of initial mixing.

It is still further desired to minimize carbon buildup on fuel nozzles.

It is still further desired to achieve streamlined flow with a high degree of velocity uniformity and low turbulence levels.

It is still further desired to minimize the mean velocity differential between the fuel stream and the oxidant stream at the point of initial mixing.

It is still further desired to reduce non-uniformity in reactant flow distribution at the burner nozzle, while also reducing burner inlet gas pressure and turbulence.

It is still further desired to improve furnace performance by operating burners with higher momentum and more staging, which will lead to longer, more stable, fuel-rich flames with lower nitrogen oxide ($NO_x$) emissions.

It is still further desired to improve furnace performance with longer, more stable flames delivering higher overall rates of heat transfer to loads in the furnace.

It is still further desired to further improve glass furnace performance by providing higher rates of heat transfer from flame to glass, thereby increasing glass bottom temperatures, enhancing recirculation of glass from refiner to tank, and reducing glass defects (increasing yield).

It is also desired to extend the range of burner firing rates.

BRIEF SUMMARY OF THE INVENTION

The present invention is a burner and a method for combusting a fuel with an oxidant. There are multiple embodiments of the burner and the method, as well as multiple variations of those embodiments.

There are multiple elements in a first embodiment of the burner for combusting a fuel. The first element is a fuel conduit having a plurality of fuel sections, each fuel section being in fluid communication with each other fuel section and adapted to transmit a stream of the fuel. A second element is a first oxidant conduit having a plurality of oxidant sections, each oxidant section being in fluid communication with each other oxidant section and adapted to transmit a stream of an oxidant.

The fuel conduit of the first embodiment of the burner includes a fuel inlet section, a fuel transitional section, and a fuel outlet section. The fuel inlet section has a first fuel inlet and a first fuel outlet spaced apart from the first fuel inlet, the fuel inlet section having a first cross sectional flow area and being adapted to transmit the stream of the fuel entering the first fuel inlet and exiting the first fuel outlet. The fuel transitional section has a fuel intake and a fuel outtake spaced apart from the fuel intake, the fuel transitional section adapted to transmit at least a portion of the stream of the fuel entering the fuel intake and exiting the fuel outtake, and having a second cross sectional flow area, the second cross sectional flow area varying from an initial cross sectional flow area at the fuel intake to a different cross sectional flow area at the fuel outtake. The fuel outlet section has a second fuel inlet and a second fuel outlet spaced apart from the second fuel inlet, the fuel outlet section being adapted to transmit at least a portion of the stream of the fuel entering the second fuel inlet and exiting the second fuel outlet, and having a third cross sectional flow area, the third cross sectional flow area being substantially uniform throughout the fuel outlet section.

The first oxidant conduit of the first embodiment of the burner includes an oxidant inlet section and an oxidant outlet section. The oxidant inlet section has a first oxidant inlet and a first oxidant outlet spaced apart from the first oxidant inlet, the oxidant inlet section being adapted to transmit a stream of the oxidant entering the first oxidant inlet and exiting the first oxidant outlet, and having a fourth cross sectional flow area, at least a portion of the oxidant inlet section being spaced around substantially all of at least a portion of at least one of the fuel inlet section, the fuel transitional section, and the fuel outlet section. The oxidant outlet section has an oxidant intake and an oxidant outtake spaced apart from the oxidant intake, the oxidant outlet section being adapted to transmit at least a portion of the stream of the oxidant entering the oxidant intake and exiting the oxidant outtake, and having a fifth cross sectional flow area, said fifth cross sectional flow area being less than or equal to the fourth cross sectional flow area and being substantially uniform throughout the oxidant outlet section, at least a portion of the oxidant outlet section being spaced around substantially all of at least a portion of the fuel outlet section.

There are many variations of the first embodiment of the burner. In one variation, a ratio of the fifth cross sectional flow area of the oxidant outlet section to the third cross sectional flow area of the outlet section is less than a molar ratio of the oxidant to the fuel required for stoichiometric combustion.

A second embodiment of the burner is similar to the first embodiment but includes a Y-shaped oxidant inlet conduit in fluid communication with the oxidant inlet section and adapted to feed the stream of the oxidant to the first oxidant inlet of the oxidant inlet section.

A third embodiment of the burner is similar to the first embodiment, but includes at least one guide vane disposed in the fuel transitional section, wherein the initial cross sectional flow area at the fuel intake of the fuel transitional section is smaller than the different cross sectional flow area at the fuel outlet of the fuel transitional section.

A fourth embodiment of the burner is similar to the first embodiment but includes a second oxidant conduit adjacent the first oxidant conduit, the second oxidant conduit having a second oxidant inlet and a second oxidant outlet spaced apart from the second oxidant inlet, the second oxidant conduit adapted to transmit another stream of the oxidant or a stream of another oxidant entering the second oxidant inlet and exiting the second oxidant outlet. In a variation of this embodiment, the another stream of the oxidant or the stream of the another oxidant exiting the second oxidant outlet of the second oxidant conduit is in a location below a flame formed by combustion of the at least a portion of the stream of the fuel exiting the second fuel outlet of the fuel outlet section and the at least a portion of the stream of the oxidant exiting the oxidant outtake of the oxidant outlet section.

In a fifth embodiment of the burner for combusting a fuel, the burner has a longitudinal axis and includes a burner tip having a first elongated edge adjacent a flow of the fuel, and a second elongated edge adjacent a flow of an oxidant and forming a primary tip angle ($\alpha$) of less than about 15° from a line parallel to the longitudinal axis and intersecting an upstream surface parallel to the longitudinal axis. In this embodiment, the first elongated edge, and the second elongated edge form a secondary tip angle ($\beta$) greater than the primary tip angle ($\alpha$) and less than about 90° from a line tangent to and extending from the first elongated edge in the direction of the flow of the fuel. In a variation of this embodiment, the second elongated edge includes an initial tapered section forming the primary tip angle ($\alpha$), and a curved section terminating at the first elongated edge.

Another aspect of the invention is a furnace for melting glass, the furnace having at least one burner as in any of the embodiments or variations discussed above.

There are multiple steps in a first embodiment of the method for combusting a fuel with an oxidant. The first step is to provide a source of the fuel. The second step is to provide a source of at least one oxidant. The third step is to provide a burner, such as the first embodiment of the burner discussed above. The fourth step is to transmit the stream of the fuel to the first fuel inlet, whereby at least a portion of the stream of the fuel is transmitted from the first fuel inlet to the second fuel outlet. The fifth step is to transmit the stream of the oxidant to the first oxidant inlet, whereby at least a portion of the stream of the oxidant is transmitted from the first oxidant inlet to the oxidant outtake. The sixth step is to combust at least a portion of the fuel exiting the second fuel outlet with at least a portion of the oxidant exiting the oxidant outtake.

There are many variations of the first embodiment of the method for combusting a fuel with an oxidant. In one variation, a ratio of the fifth cross sectional flow area of the oxidant outlet section to the third cross sectional flow area of the fuel outlet section is less than a molar ratio of the oxidant to the fuel required for stoichiometric combustion.

A second embodiment of the method is similar to the first embodiment of the method, but includes two additional steps. The first additional step is to provide a Y-shaped oxidant inlet conduit in fluid communication with the oxidant inlet section and adapted to feed the stream of the oxidant to the first oxidant inlet of the oxidant inlet section. The second additional step is to feed at least a portion of the oxidant to the Y-shaped oxidant inlet conduit.

A third embodiment of the method is similar to the first embodiment of the method, but includes the further step of providing at least one guide vane disposed in the fuel transitional second, wherein the initial cross sectional flow area of the fuel intake of the fuel transitional section is smaller than the different cross sectional flow area at the fuel outtake of the fuel transitional section.

A fourth embodiment of the method is similar to the first embodiment of the method but includes three additional steps. The first additional step is to provide a second oxidant conduit adjacent the first oxidant conduit, the second oxidant conduit having a second oxidant inlet and a second oxidant outlet spaced apart from the second oxidant inlet, the second oxidant conduit adapted to transmit another stream of the oxidant or a stream of another oxidant entering the second oxidant inlet and exiting the second oxidant outlet. The second additional step is to transmit the another stream of the oxidant or the stream of the another oxidant to the second oxidant inlet, whereby at least a portion of the another stream of the oxidant or at least a portion of the another oxidant is transmitted from the second oxidant inlet to the second oxidant outlet. The third additional step is to combust at least another portion of the fuel exiting the second fuel outlet with at least a portion of the another stream of the oxidant or at least a portion of the another oxidant exiting the second oxidant outlet. In a variation of this embodiment, the another stream of the oxidant or the stream of the another oxidant exiting the second oxidant outlet of the second oxidant conduit is at a location below a flame formed by combustion of the at least a portion of the stream of the fuel exiting the second fuel outlet of the fuel outlet section and the at least a portion of the stream of the oxidant exiting the outtake of the oxidant outlet section.

Another embodiment of the method for combusting a fuel with an oxidant includes multiple steps. The first step is to provide a source of the fuel. The second step is to provide a source of the oxidant. The third step is to provide a burner for combusting the fuel with the oxidant, such as the burner in the fifth embodiment of the burner discussed above. The fourth step is to combust at least a portion of the fuel with at least a portion of the oxidant at a location adjacent the burner tip. In a variation of this embodiment of the method, the second elongated edge includes an initial tapered section forming the primary tip angle ($\alpha$) and a curved section terminating at the first elongated edge.

Another aspect of the invention is a process for melting glass, the process including a method for combusting a fuel with an oxidant as in any of the embodiments and variations discussed above.

BRIEF DESCRIPTION OF THE DRAWINGS

The invention will now be described by way of example with reference to the accompanying drawings, in which:

FIG. 2 is a schematic diagram of a side view of a burner tip for one embodiment of the invention;

FIG. 3 is a schematic diagram of a front view of a burner tip for one embodiment of the invention;

FIG. 19 is a schematic diagram illustrating a layout of a glass furnace.

DETAILED DESCRIPTION OF THE INVENTION

The invention is a burner and a method for combusting a fuel with an oxidant. Although the invention is discussed herein in the context of an oxygen/gas (oxy/gas) burner for glass melting applications, it is not limited to such burners and applications. Persons skilled in the art will recognize that the burner and method may be used in many other fired process heating applications, including but not limited to cement kilns, ferrous/non-ferrous metal melting furnaces, and steam generators.

When used in glass melting applications, the oxy/gas burner produces a high-temperature, wide flame with an expanded turndown ratio and capability to stage (i.e., delay introduction of) a high percentage of oxygen below the flame for enhanced radiation, lower $NO_x$, and greater control of flame length and momentum than could previously be achieved with prior art burners. This enhanced performance is a result of the novel design and arrangement of the components of the burner. In glass melting applications, the burner is generally used in conjunction with a refractory burner block positioned between the burner and furnace combustion space.

As used herein, the term "fuel" refers to any gaseous fuel suitable for combustion purposes. Although one preferred fuel is natural gas, different fuel gases, such as hydrogen, ethane, propane, butane, acetylene, and other gaseous fuels and combinations thereof may be used As used herein, the term "oxidant" refers to oxygen, oxygen-enriched air, or any other suitable oxidant with an oxygen concentration greater than about 21% by volume. One preferred oxidant is commercially pure oxygen generated by a cryogenic air separation plant or an adsorption process. The oxygen concentration of such oxidant is typically greater than 90% by volume. Combination of commercially pure oxygen and natural gas is often used in high-temperature furnaces, such as glass melting furnaces.

Figure 1:
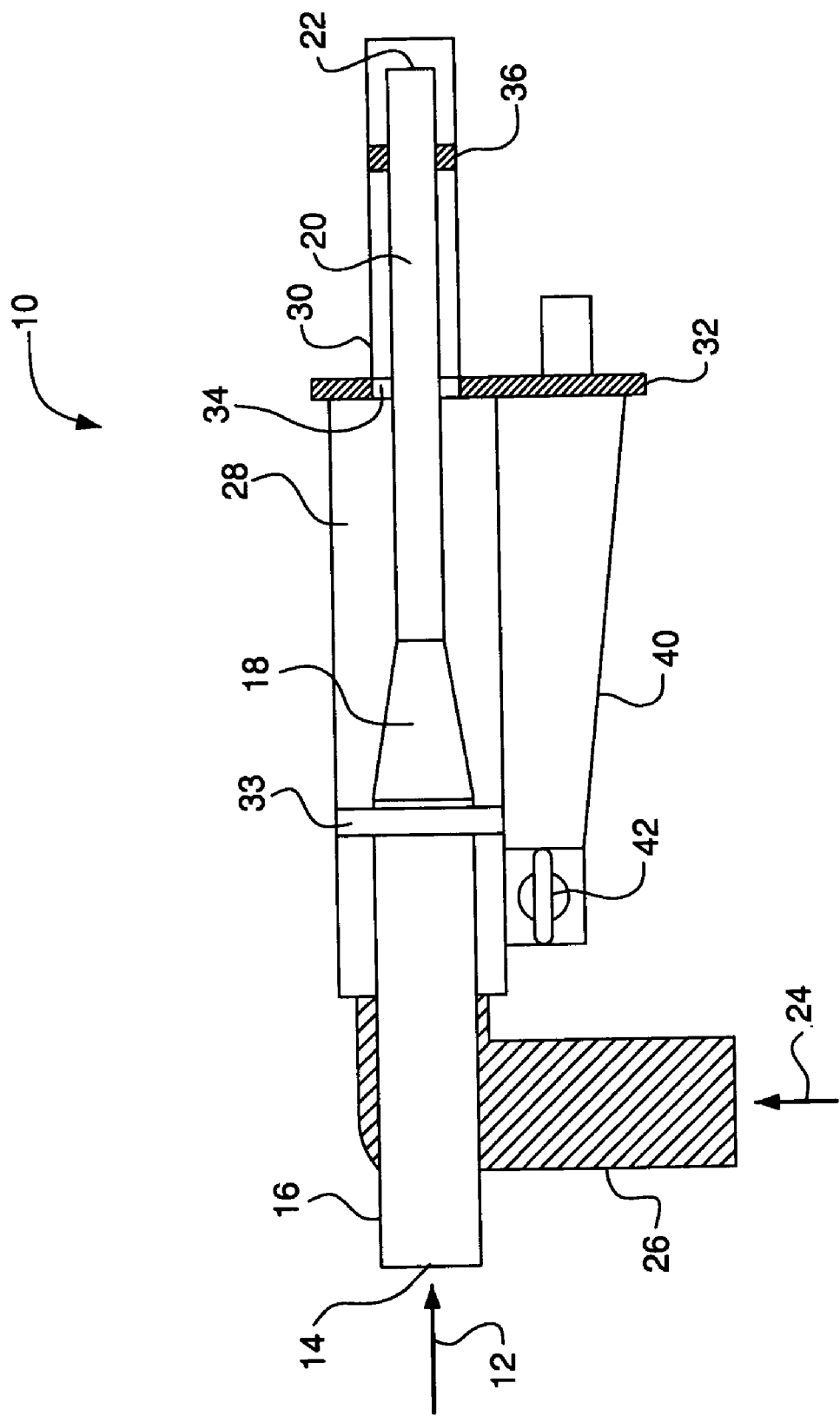
FIG. 1 is a schematic diagram of a side view of one embodiment of the invention.

FIG. 1 shows a side view of one embodiment of the burner 10 of the present invention. A fuel 12, such as natural gas, enters the fuel inlet 14 of the fuel inlet section 16. The fuel flows through the fuel inlet section, the fuel transitional section 18, and the fuel outlet section 20, exiting at a fuel outlet 22. In the embodiment illustrated in FIG. 1, the fuel inlet section is a round pipe, the fuel transitional section is a round-to-flat transitional section, and the fuel outlet section is a flat cross sectional piece. Preferably, the three sections are a single-piece, three-section, pre-welded fuel nozzle assembly.

Figure 4:
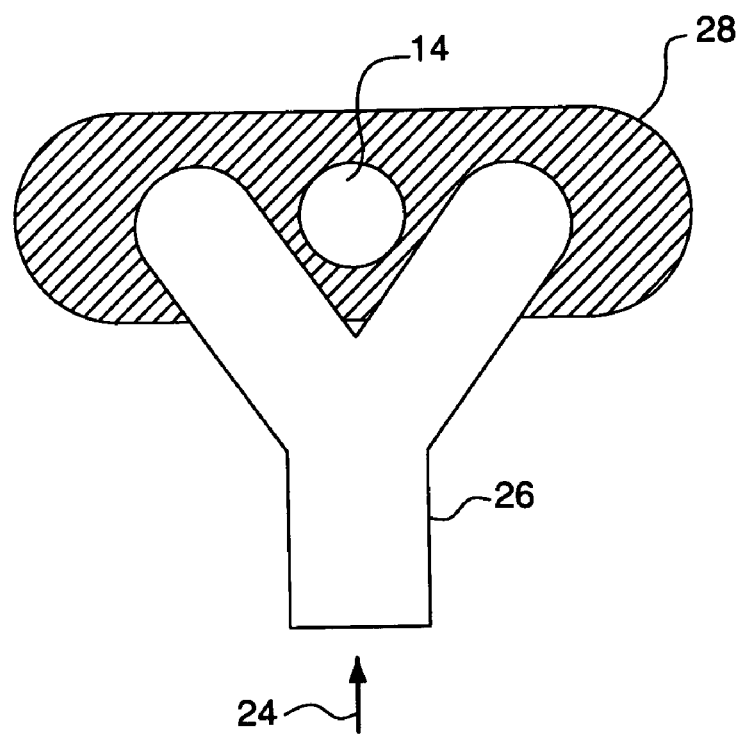
FIG. 4 is a schematic diagram of an end view of a burner for one embodiment of the invention illustrating a Y-shaped oxidant inlet.
Figure 6:
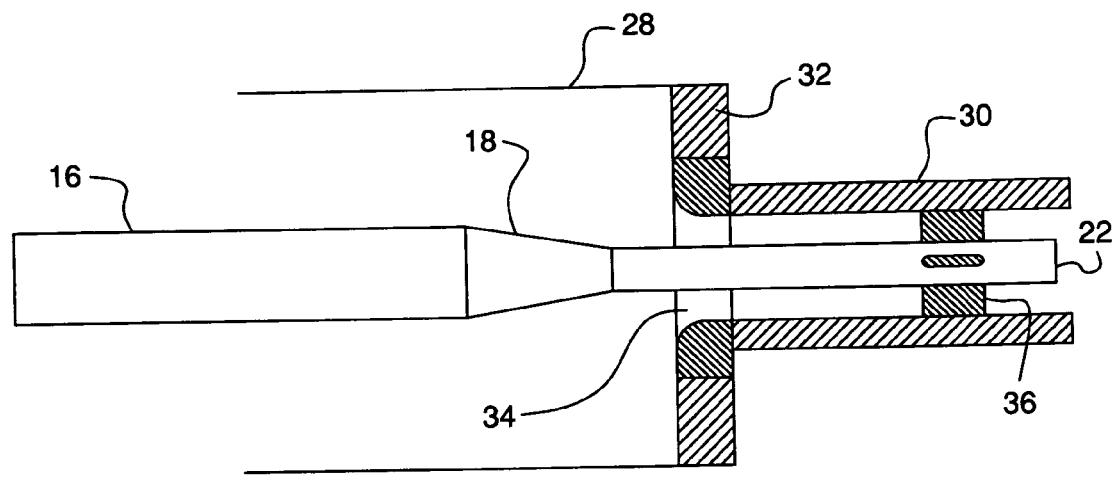
FIG. 6 is a schematic diagram of a side view of a portion of the burner for one embodiment of the invention illustrating one preferred shape of the oxidant plenum.
Figure 7:
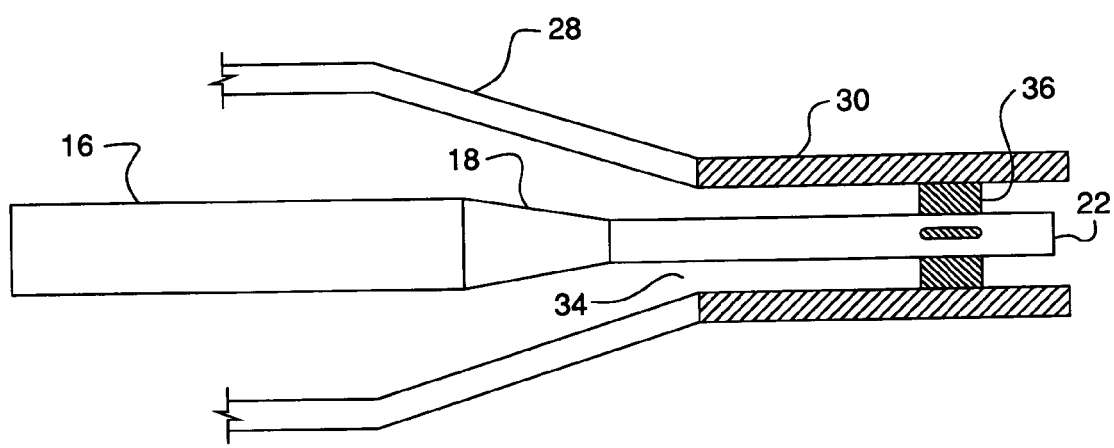
FIG. 7 is a schematic diagram of a side view of another embodiment of the invention illustrating an alternate shape of the oxidant plenum.

Referring still to FIG. 1, an oxidant 24, such as oxygen, is fed to an oxidant inlet manifold 26, such as the streamlined Y-shaped oxidant inlet shown in FIG. 4. Eventually, the oxidant flows to an oxidant inlet section or oxidant plenum 28 and is transmitted to an oxidant outlet section 30. A plate 32 between the oxidant plenum and the oxidant outlet section has an opening 34 through which the oxidant flows, as shown in FIG. 2. FIG. 6 further illustrates this embodiment. Persons skilled in the art will recognize that alternate embodiments are possible, such as the alternate embodiment shown in FIG. 7.

As shown in FIG. 1, streamlined locating pins 36 provide support between the fuel outlet section 20 and the oxidant outlet section 30. An oxidant diffuser 33 may be provided upstream of the oxidant plenum 28. The purpose of this diffuser is to assist in distributing the oxidant flow entering the oxidant plenum. Referring still to FIG. 1, another oxidant conduit 40 (staging oxygen plenum) adjacent the oxidant plenum 28 provides the capability for staging. The flow of oxidant from the oxidant inlet manifold to the staging oxidant plenum or oxidant conduit may be regulated by a staging valve 42 or other regulating means.

FIG. 2 illustrates the burner outlet section formed by the fuel outlet section 20 and the oxidant outlet section 30. FIG. 3 shows a front view of the burner outlet section for one embodiment of the burner. However, persons skilled in the art will recognize that the burner outlet section may have a shape (s) other than that shown in FIG. 3.

Figure 8:
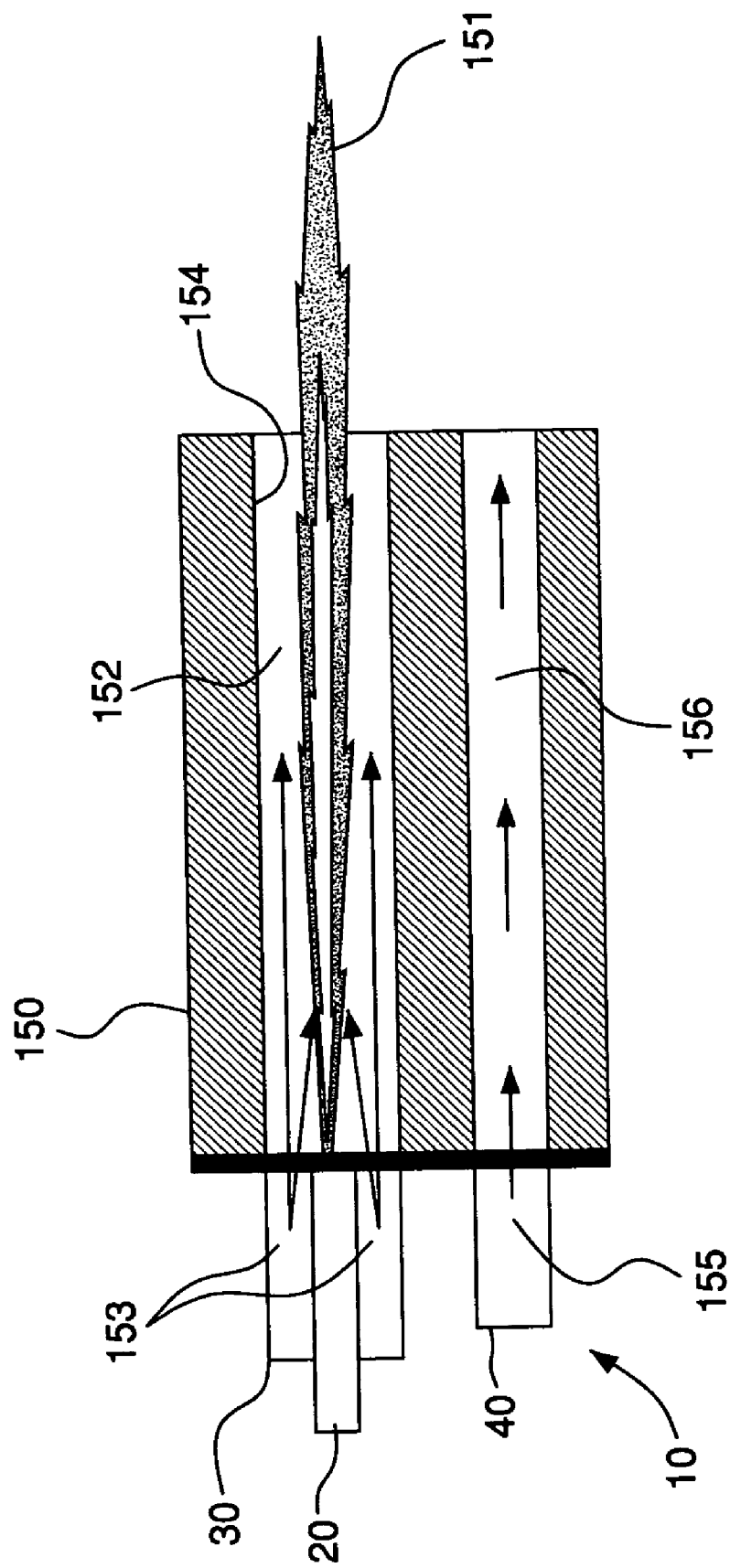
FIG. 8 is a schematic diagram of a cross sectional view of one embodiment of the burner of the present invention used in conjunction with a refractory burner block.

FIG. 8 shows a schematic cross sectional view of the burner 10 of the present invention coupled to a refractory burner block 150. A high temperature flame 151 forms within the top chamber 152 of the burner block. Oxidant 153 emanating from the oxidant outlet section 30 of the burner surrounds the flame, simultaneously feeding oxidant into the flame and providing convective cooling of the refractory surface 154 adjacent the flame. Staging oxidant 155 passes through the lower chamber 156 of the burner block.

The improved results of the present invention relative to the prior art are due to the unique arrangement and structure of the various components of the burner 10. Some of the more important aspects of the structure and arrangement are discussed below.

For example, as shown in FIGS. 1 and 2, the cross sectional flow area of the oxidant outlet section 30 must be less than or equal to the cross sectional flow area of the oxidant plenum 28 and is substantially uniform throughout the oxidant outlet section. (The streamlined locating pins 36 do reduce the cross sectional flow area of the oxidant outlet section by about 3% locally, but are designed so as neither generate turbulent eddies nor significantly alter the oxidant velocity distribution at the outtake of the outlet section.) The purpose of the decreasing cross sectional flow area is to allow the static pressure of the oxidant flow to decrease in the direction of flow, since such a "favorable" pressure gradient helps to eliminate velocity non-uniformities.

The cross sectional flow area of the fuel transitional section 18 varies from an initial cross sectional flow area at the fuel intake of the fuel transitional section to a different cross sectional flow area at the fuel outtake of the fuel transitional section. The cross sectional flow area of the fuel outlet section 20 is substantially uniform throughout. In one embodiment, the cross sectional flow area at the intake of the fuel transitional section is greater than or equal to the flow cross sectional area at the outtake of the fuel transitional section since this creates a favorable pressure gradient, with benefits as previously noted. (The case of equal inlet and outlet areas creates a neutral pressure gradient that does not adversely affect the flow velocity distribution.)

Figure 5:
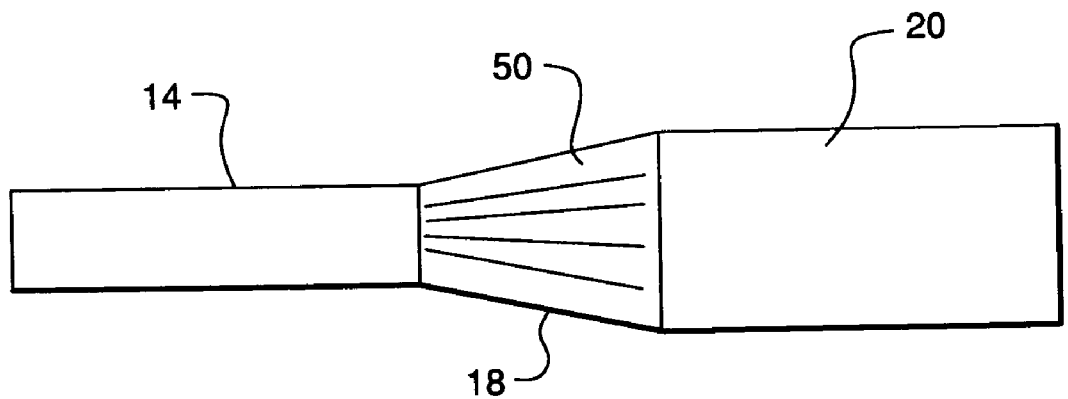
FIG. 5 is a schematic diagram of a plan view of a portion of the fuel nozzle for one embodiment of the invention illustrating the use of guide vanes in the transitional section of the fuel nozzle.

In another embodiment, the flow cross sectional area at the intake of the fuel transitional section 18 is less than the flow cross sectional area at the outtake of the fuel transitional section. Such an embodiment favors the generation of an "adverse" pressure gradient (pressure increasing in the direction of flow) that, without intervention, would lead to increases in velocity non-uniformity and potentially the formation of reverse flow regions and high levels of turbulence. In order to prevent these deleterious consequences, this embodiment requires the insertion of one or more guide vanes 50 as shown in FIG. 5.

In one embodiment, the cross sectional flow area at the fuel outtake of the fuel transitional section 18 is substantially non-circular, and the cross sectional flow area of the fuel outlet section 20 is substantially non-circular. In another embodiment, the fuel outlet section has an aspect ratio (width: height) of greater than about 2:1 at the fuel outlet 22, and the fuel transitional sectional has an aspect ratio of greater than about 2:1 at the fuel outtake. In yet another embodiment, a ratio of the cross sectional flow area at the outtake of the oxidant outlet section 30 to the cross sectional flow area at the fuel outlet of the fuel outlet section 20 is less than a molar ratio of the oxidant to the fuel required for stoichiometric combustion. (Stoichiometric combustion is theoretically complete combustion of the fuel with no excess oxidant. For the combustion of methane with oxygen, the aforementioned area ratio would therefore be less than 2:1 in this embodiment.)

This aspect of the invention establishes a ratio of mean flow velocities in the fuel outlet section 20 and oxidant outlet section 30 that is equal to 1.0 only when there is less than a stoichiometric amount of oxidant flowing through the oxidant outlet section. The effect thus achieved is to minimize the difference between mean flow velocities of fuel and oxidant streams and, hence, the shear stress and rate of mixing between the reactant streams, when less than stoichiometric oxidant is flowing through the oxidant outlet section. The consequent benefit is to allow for high percentages of oxidant staging without risking high temperature damage to the burner 10 or refractory burner block 150. Higher staging levels yield longer, more luminous flames that produce greater energy efficiency and reduced NOx emissions.

The improved results achieved by aspects of the invention thus far described were verified through laboratory and field tests comparing the performance of the burner of the present invention to the prior art burner taught in U.S. Pat. No. 5,611, 682 (Slavejkov, et al.). Some of the results of these tests and the comparisons are discussed below.

Measurements were made of the velocity distributions at the fuel and oxidant outlets of the two burners. Velocity non-uniformity was quantified using a single parameter that represents the standard deviation of local velocity from the mean velocity in a particular flow cross section. Results of the measurements and subsequent calculations indicate that the velocity non-uniformity of the burner of the present invention is, on average, one-third the magnitude of the prior art burner. The nozzle flow distribution achieved with the burner of the present invention translates into better control of the mixing processes between oxygen and natural gas. Specifically, better uniformity means lower shear rates and less chance of localized depletion of oxygen. Consequently, there is greater staging capacity and less risk of overheating within the pre-combustor or burner block. Moreover, better uniformity of reactant flow results in better uniformity of flame properties and, in particular, reduction of peak flame temperatures that lead to furnace refractory overheating and higher NOx emissions.

A comparison of the fuel inlet static pressure requirements of the two burners showed a substantial reduction in fuel inlet pressure requirement relative to the prior art burner. In particular, measurements showed a reduction of greater than 80% in fuel inlet pressure in the burner of the present invention. The pressure reduction is principally due to the requirement that the cross sectional flow area of the fuel outlet section 20 is substantially uniform throughout. Hence, no static mixing devices (such as baffle plates) exist in the outlet section. These static mixing devices are conventionally used to improve velocity uniformity by creating a large pressure drop (which dissipates energy in the form of turbulent eddies) and promoting turbulent mixing. The burner of the present invention avoids the need for static mixing devices and thus accomplishes the velocity profile "smoothing" within the fuel transitional section 18 with minimal pressure loss and negligible generation of turbulence.

Measurements show that the fuel inlet pressure of the burner 10 of the present invention is lowest for the embodiment that utilizes guide vanes 50 in the fuel transitional section 18, since the guide vanes effectively convert a portion of the kinetic energy at the intake to the transitional section to pressure energy at the outtake of the transitional section, while still achieving the required velocity smoothing.

The burner 10 of the present invention also requires substantially lower oxygen inlet pressure than the prior art burner for two modes of operation: 1) staging valve 42 closed, and 2) staging valve wide open. Similar to the fuel inlet pressure, the primary reason for this is that the cross sectional flow area of the oxidant outlet section 30 is substantially uniform throughout the oxidant outlet section and, hence, free from flow-disrupting, turbulence-generating effects of static mixing devices. Smoothing of the oxygen velocity distribution occurs between the oxygen plenum 28 and the intake to the oxygen outlet section 30 via the reduction in cross sectional flow area that takes place between these two sections.

Since most burner installations have limited oxygen and/or fuel supply pressures, a principal advantage of the substantial reductions in fuel and oxygen pressure requirements achieved with the present invention is the ability to fire burners at a higher throughput. In some cases the lower pressures may also result in lower power consumption for an air separation plant supplying oxygen as the oxidant. Moreover, the lower turbulence level generated in the burner of the present invention results in the ability to operate the burner at elevated throughput with lower risk of burner overheating or furnace temperature maldistribution caused by the generation of a short, excessively turbulent flame.

Figure 9:
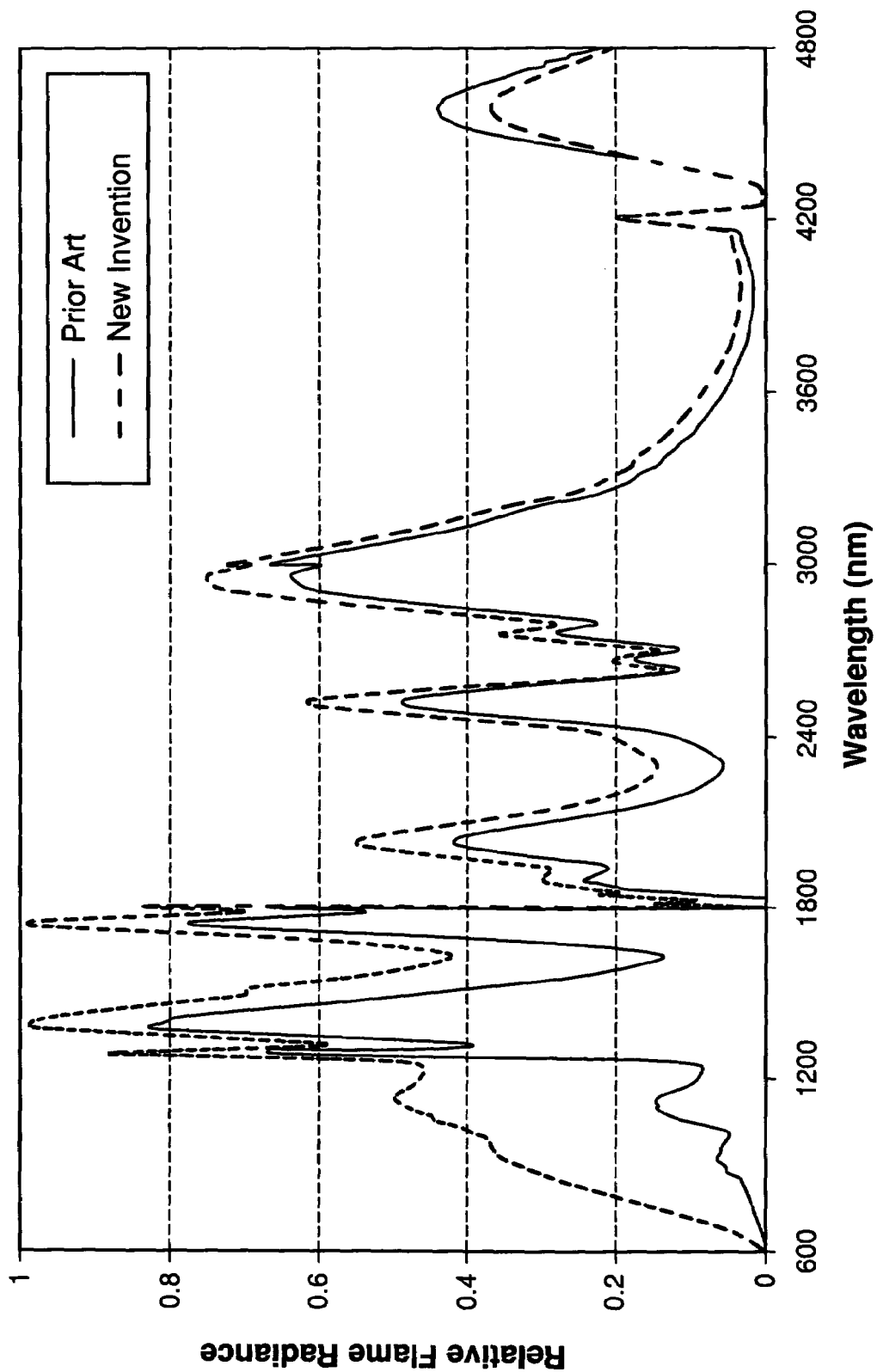
FIG. 9 is a graph comparing the relative flame radiance of a burner of the present invention to that of a prior art burner at different wavelengths.

Spectral radiation measurements were also made of the flames of the two burners during open-air firing. A comparison of the flame spectral emissions at 15 MMBtu/hr firing rate, with oxidant staging levels set at their respective maximum design levels, is presented in FIG. 9. The maximum design staging level for these burners is determined by the ability of the oxidant issuing through the oxidant outlet section 30 to provide adequate cooling of the precombustor over the entire range of burner firing rate. The maximum oxygen staging level achievable in practice for the burner of the present invention is at least 70% of the total combustion oxygen, whereas a maximum staging level for the prior art burner is generally in the 40% range, depending on firing rate.

The staging limits for the burner of the present invention are enlarged relative to the prior art because the improved nozzle flow distribution and lower turbulence levels reduce the rate of mixing between fuel and oxygen streams within the pre-combustor and also minimize the occurrence of local deficiencies in oxygen flow. These enhanced flow characteristics ensure adequate precombustor cooling for the burner of the present invention, even during operation with extremely high staging levels and high firing rates.

As shown, there is a substantially higher radiation emitted from the burner of the present invention (greater than 25% overall increase). The principal radiation enhancement occurs in the wavelength band below 1800 nm, signifying an increase in blackbody emission, the cause of which is the more fuel-rich primary flame for the burner (due to higher oxygen staging levels) and, consequently, more abundant formation and growth of soot particles. Radiation heat transfer over this range of the electromagnetic spectrum is ideal in glass melting tanks because the spectral range lies within the region of highest optical transmissivity of molten glass. Hence, energy transferred from the flame is able to penetrate deeply into the glass melt, providing more uniform heating and efficient utilization of available energy in the fuel.

Figure 10:
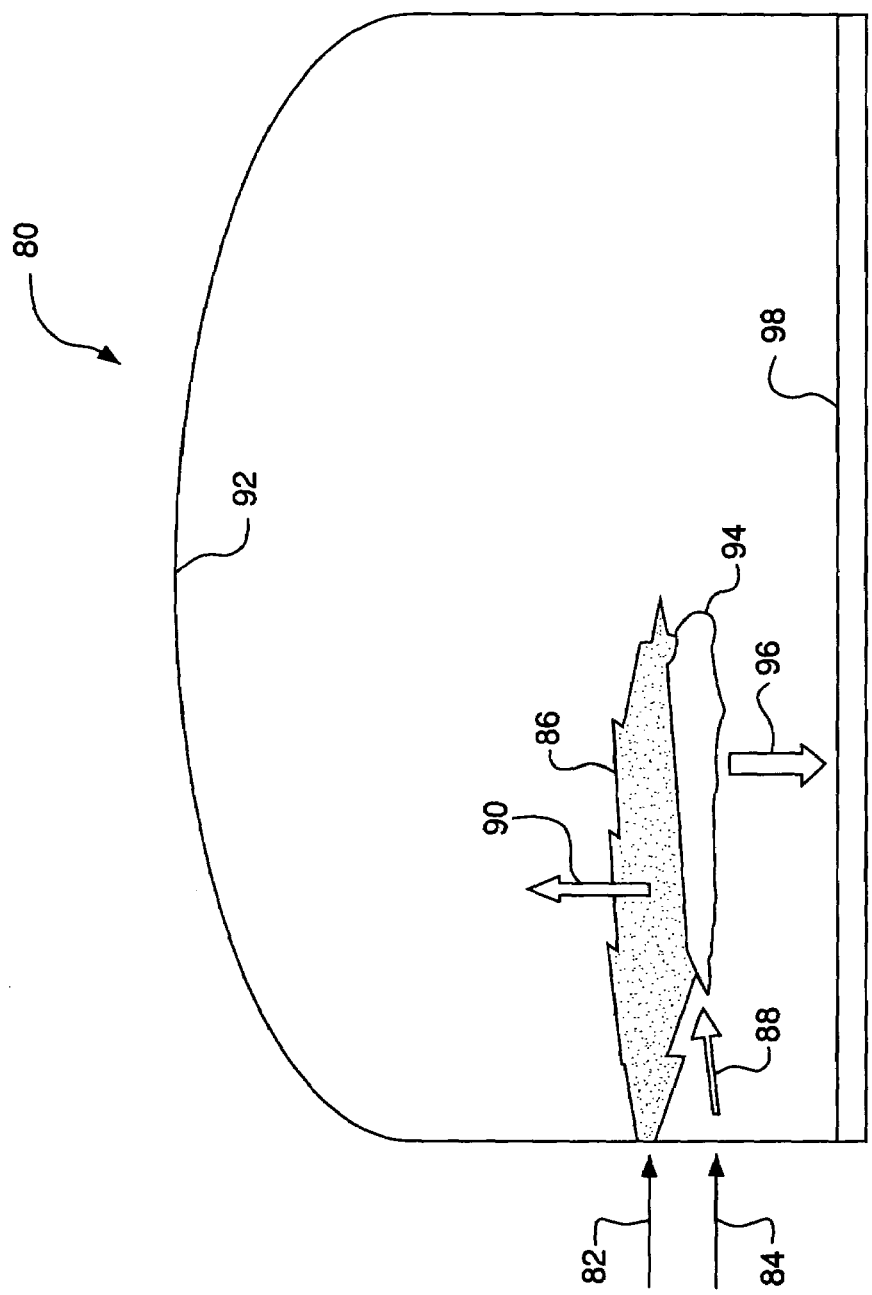
FIG. 10 is a schematic diagram illustrating mechanisms of radiation heat transfer from a flame generated within a glass furnace by a burner and method of the present invention.

FIG. 10 shows a side view of the operation of the burner of the present invention in a typical glass furnace 80. Fuel 82 and oxygen 84 are combusted in the burner to create a fuel-rich primary flame 86 under which the staging oxidant 88 is transmitted. The fuel-rich primary flame has a high soot concentration. Upward radiation 90 is transmitted toward the furnace crown 92. The reaction of the staging oxidant creates a relatively hot stoichiometric flame 94 on the underside of the primary flame from which downward radiation 96 is transmitted to the raw material 98 or load. A principal effect of under-flame staging is that it produces blackbody radiation that is preferentially directed downward toward the raw material 98 or load. The primary mechanisms driving this effect are the enhanced soot formation of the fuel-rich primary flame 86 coupled with the high-temperature, high luminosity, under-side of the flame 94 created by the reaction between the staging oxidant 88 and the primary flame. While the radiation 96 emanating from the under-side of the flame has an essentially unobstructed path downward toward the raw material (e.g., glass melt), the opaque, "optically-thick" primary flame partially obstructs the upward transmission of radiation. The biasing effect thus produced is clearly beneficial to the glass melting process since it maximizes the heating of the glass surface by the flame while minimizing direct radiative heating of the furnace crown 92.

Figure 11:
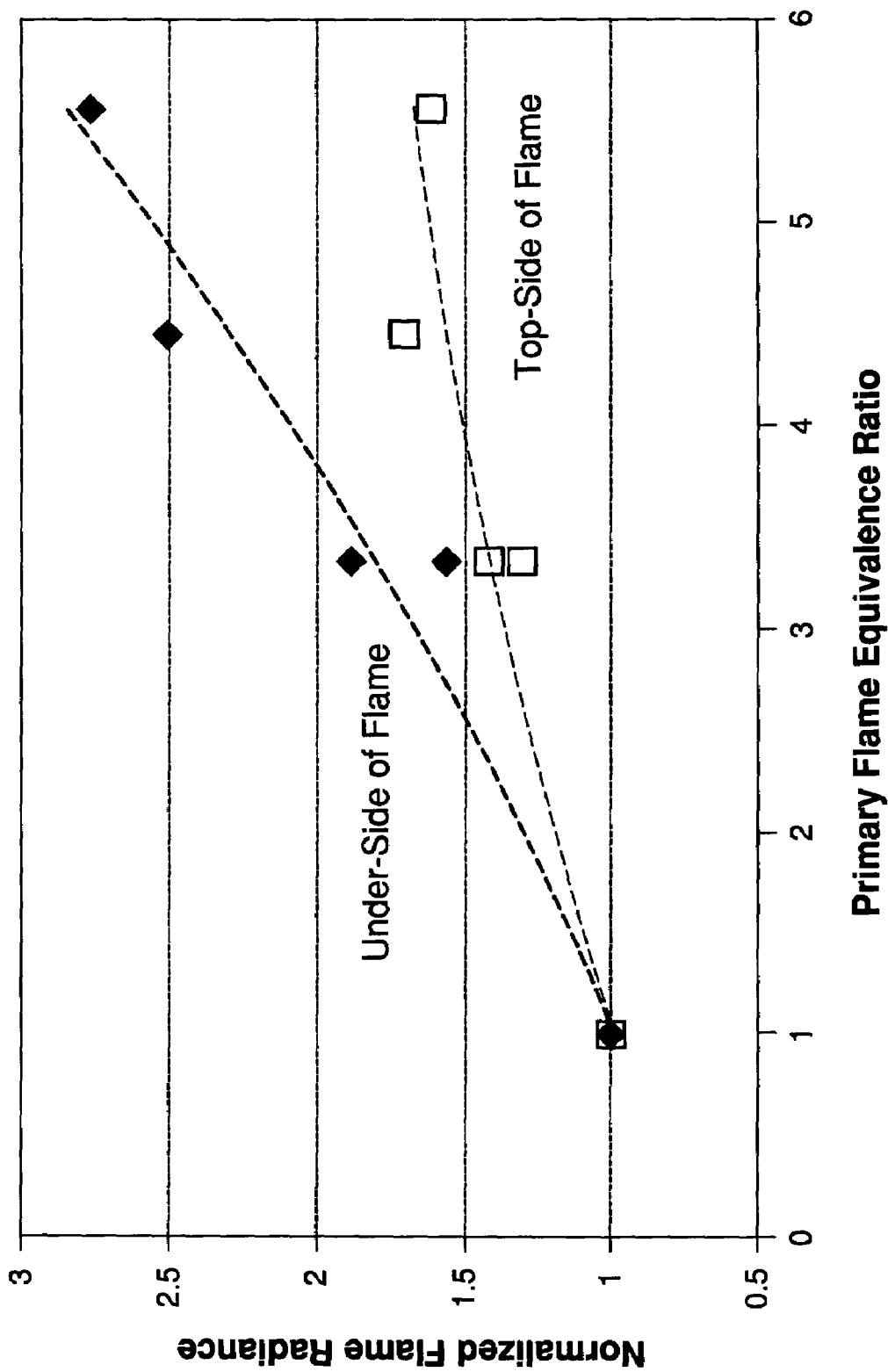
FIG. 11 is a graph illustrating the normalized flame radiance as measured above and beneath a flame generated by a burner and method of the present invention.

Referring to FIG. 11, laboratory measurements were made of the thermal radiation emanating downward and upward from the burner of the present invention over the bandwidth from 600 to 1800 nm. Results are presented as normalized flame radiance versus primary flame equivalence ratio. The normalized flame radiance is the flame radiance, integrated over the stated bandwidth, divided by the integrated flame radiance at a primary flame equivalence ratio of 1.0 (corresponding to stoichiometric combustion with no staging). The primary flame equivalence ratio is the actual ratio of fuel to (primary) oxidizer divided by the fuel to oxidizer ratio for stoichiometric combustion. Hence, higher equivalence ratios correspond to more fuel-rich primary flames. The results clearly indicate a progressively increasing difference (bias) in directional radiation with increasing equivalence ratio. The more fuel-rich the primary flame, the higher the percentage of total blackbody radiation directed downward. Thus, the ability to operate with higher levels of oxidant staging afforded by the burner of the present invention not only produces a more radiant flame, but directs a greater percentage of that radiation toward the raw material 98, while shielding the crown 92 from excessive radiation.

Figure 12:
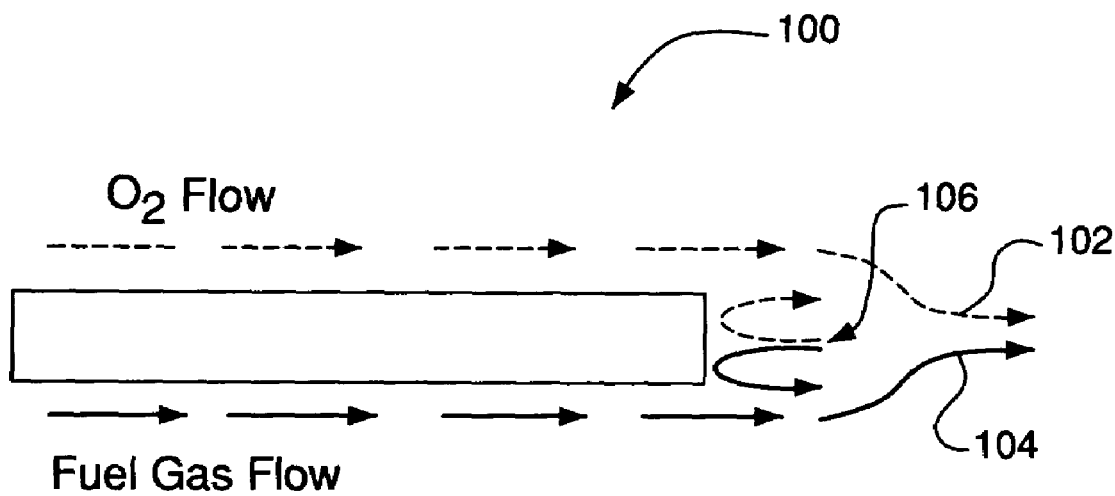
FIG. 12 is a schematic diagram illustrating a square end burner tip design.

FIGS. 12–17 and the discussion below pertain to the advanced nozzle tip of the burner of the present invention which provides for enhanced burner durability and reduced burner maintenance. The tip design, as used in this context, refers to the contour of the surface separating the oxidant and fuel streams just upstream of the point at which the reactants are discharged from the burner nozzle. Four common variations of prior art tip designs shown in FIGS. 12–15 are:

FIG. 12—Square edge
FIG. 13—Round edge
FIG. 14—Single angle, separated flow, knife-edge
FIG. 15—Single angle, attached flow, knife-edge Each of these prior art designs has at least one inherent deficiency, as discussed below.

The square end burner tip 100 shown in FIG. 12 results in separated flow of the oxidant 102 and the fuel 104 at the tip. Depending on the ratio of oxidant and fuel velocities, this may produce relatively large-scale, symmetric recirculation vortices 106, segments of which will be fuel-rich, promoting the growth of solid carbon on the tip.

Figure 13:
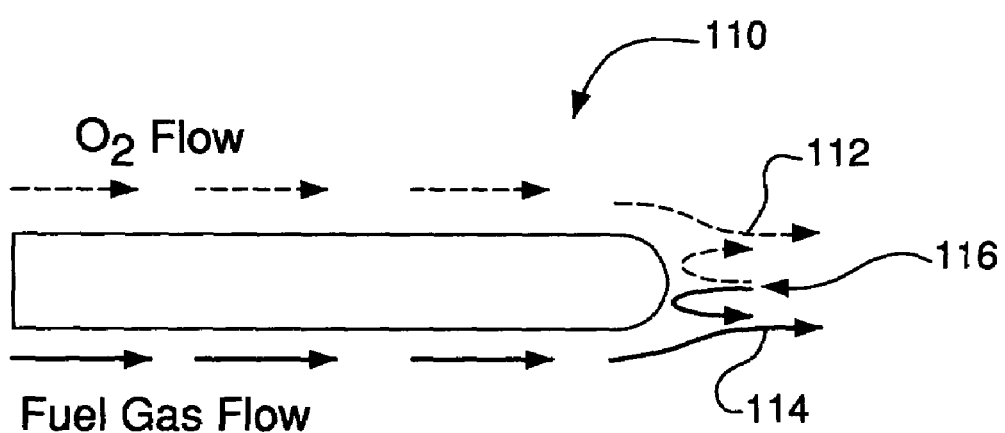
FIG. 13 is a schematic diagram illustrating a round end burner tip design.

The round end burner tip 110 shown in FIG. 13 also results in separated flow of the oxidant 112 and the fuel 114 at the tip. Depending on the ratio of oxidant and fuel velocities, this may also produce smaller (compared to square end) but still substantial, symmetrical recirculation vortices 116, segments of which will be fuel-rich, promoting the growth of solid carbon on the tip.

Figure 14:
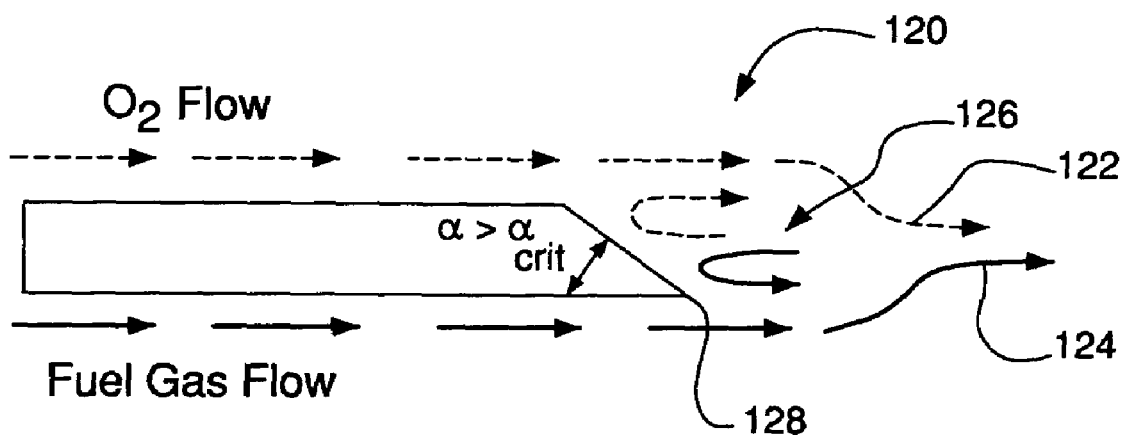
FIG. 14 is a schematic diagram illustrating a single angle, separated flow, knife-edge burner tip design.

The single angle, separated flow, knife-edge burner tip 120 shown in FIG. 14 also results in separated flow of the oxidant 122 and the fuel 124 at the tip. Depending on the ratio of oxidant and fuel velocities, this may also produce two relatively large-scale, non-symmetrical recirculation vortices 126, segments of which will be fuel-rich, promoting the growth of solid carbon on the tip. The sharp edge 128 at the bottom right of the nozzle tip also can restrict heat conduction away from the tip, resulting in thermally-induced distortion of the tip. The critical angle ($\alpha_{crit}$) for flow separation is nominally less than 15 degrees.

Figure 15:
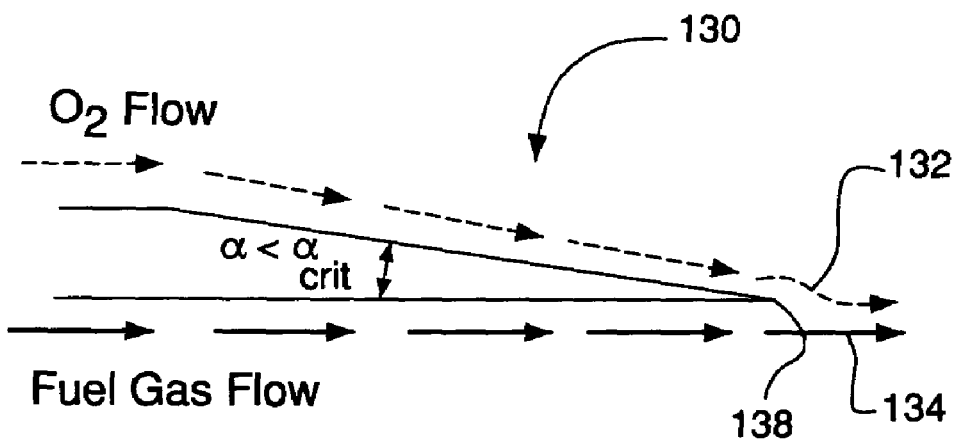
FIG. 15 is a schematic diagram illustrating a single angle, attached flow, knife-edge burner tip design.

The single angle, attached flow, knife-edge burner tip 130 shown in FIG. 15 is an improvement over the designs in FIGS. 12–14. Since the divergence angle of the oxidant surface is less than the critical angle ($\alpha_{crit}$) for flow separation, the oxidant 132 and fuel 134 flows remain attached to the nozzle tip, and carbon buildup on the tip is prevented. However, the thin, sharp edge 138 is mechanically unstable and even more prone to thermally-induced tip deformation than the single angle, separated flow, knife-edge design. Once deformation has occurred, burner performance is adversely affected.

As shown, each of the tip designs in FIGS. 12–15 has at least one inherent deficiency—either separated flow of one or more of the reactants, or inadequate mechanical robustness. These deficiencies are known to lead to operational and maintenance problems of carbon buildup and tip distortion, precursors to flame distortion and burner mal-performance and/or premature failure.

Figure 16:
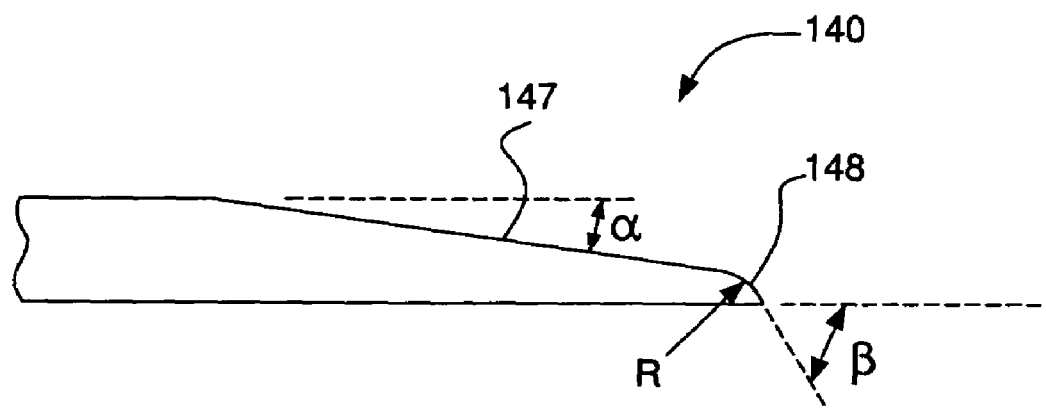
FIG. 16 is a schematic diagram illustrating one embodiment of a nozzle tip of the present invention.

The advanced nozzle tip 140 of the present invention includes three design parameters shown in FIG. 16. The primary tip angle ($\alpha$) is small enough to ensure that initial bending of the oxidant streamlines occurs without inducing flow separation. The radius (R) facilitates a smooth transition of the oxidant stream between the straight tapered section 147 and the nose 148. This radius, compared to a sharp point, substantially delays the separation of flow in this transitional region. Finally, the acute secondary angle ($\beta$) provides a termination of the nozzle that substantially restricts the fuel gas from migrating back toward the oxidant side of the nozzle.

Figure 17:
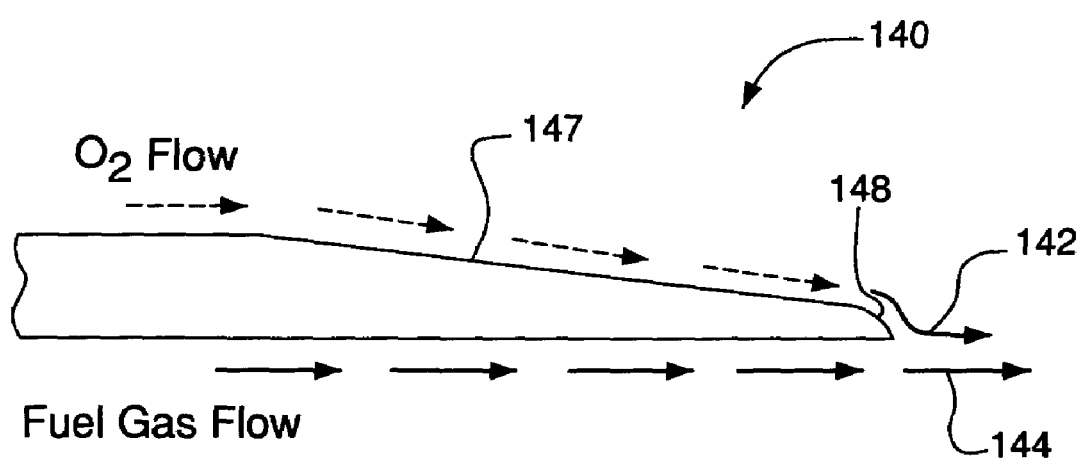
FIG. 17 is a schematic diagram illustrating reactant flow patterns for one embodiment of a nozzle tip of the present invention.

FIG. 17 illustrates the operational benefits of the advanced nozzle tip 140 of the present invention. The broad nose 148 prevents thermal deformation by providing a sufficiently broad pathway for dissipation of heat away from the tip via conduction, the acute tip angle ($\beta$) restricts fuel gas recirculation, and, depending on the ratio of oxidant and fuel velocities, there is minimal or no oxidant or fuel flow separation at the tip. Carbon buildup at the tip is thus prevented.

Figure 18:
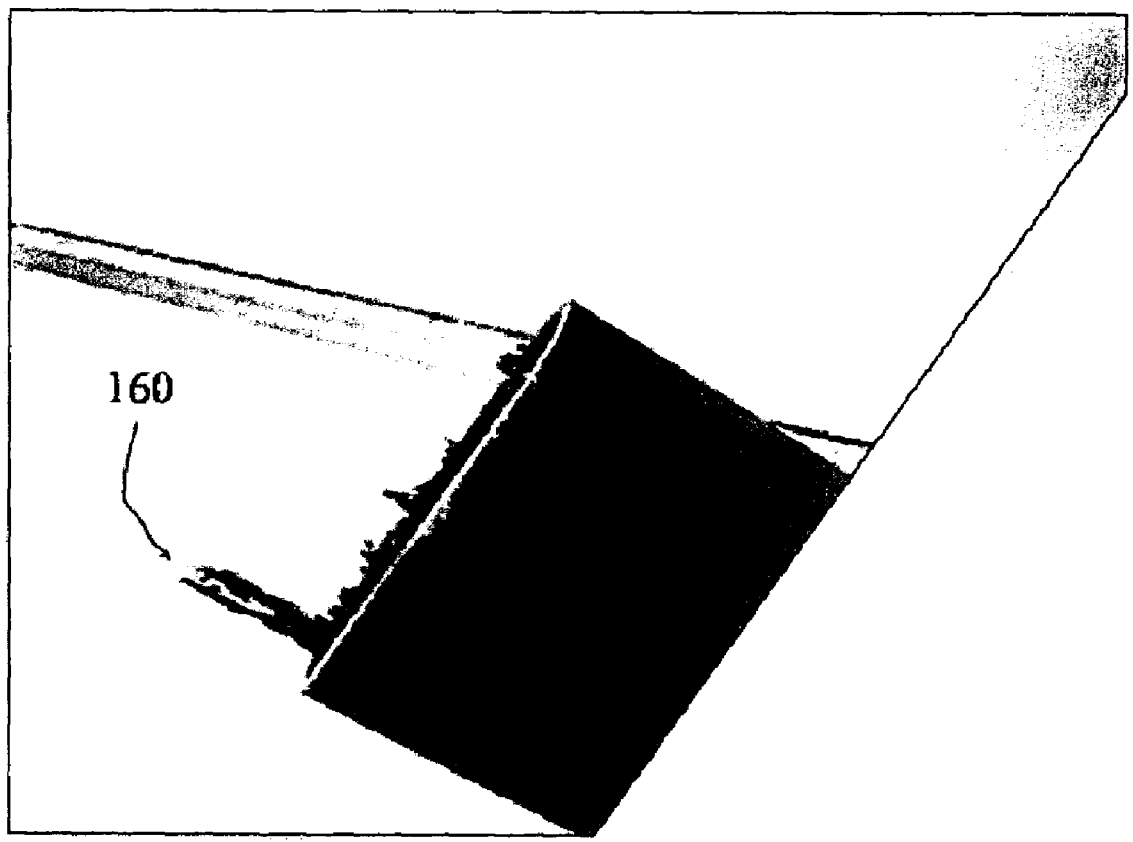
FIG. 18 is a photograph illustrating the carbon buildup occurring on the tip of a prior art burner.

In one embodiment of the invention, the ranges of the design parameters of the tip are:
primary tip angle, $\alpha$: $0<\alpha<15°$
turning radius, R: not absolutely essential, but recommended R>1/64 in
secondary angle, $\beta$: $\beta<90°$ As an example of the improvement afforded by the improved burner tip design, FIG. 18 illustrates the amount of carbon buildup 160 occurring on a tip similar in design to that illustrated in FIG. 13 over a period of operation of approximately two weeks in an industrial glass furnace. The improved burner tip design of the present invention showed no detectable carbon buildup at the same burner position with the same burner operating parameters during a period of time substantially in excess of two weeks.

FIG. 19 illustrates the layout of a typical glass furnace 60 having a left side 62 and a right side 64. Burners, such as those of the present invention, are positioned on both sides and generate high-temperature flames 66 in the furnace. Flue gases from combustion of the fuel and oxidant exit through the flues 68 shown on the left and right sides of the furnace. Batch charges 70 enter the furnace and are melted by the heat generated by the high-temperature flames. The melted product 72 is removed from the furnace and conveyed by conveying means (not shown) to a refiner (not shown).

Furnace performance is improved in a number of ways as a result of the improved performance of the burner and method of the present invention. The ability to operate the burners with higher momentum and more staging (compared to that of prior art burners) leads to longer, more stable, fuel-rich flames with lower $NO_x$ emissions. The longer, more stable flames deliver higher overall rates of heat transfer to the load. Also, the combination of better uniformity of flame properties and highly staged operation minimizes peak flame temperature/radiation, thereby helping to reduce foaming. Higher rates of heat transfer from flame to glass increase glass bottom temperatures, enhancing recirculation of glass from refiner to tank, thereby reducing glass defects (increasing yield). Finally, elimination of carbon buildup on burner tips prevents flame distortion, improves burner durability and lowers burner maintenance requirements.

Validation of the benefits to furnace performance deriving from use of the burner of the present invention was achieved by performing a full furnace test in which burners of the present invention replaced burners of the prior art as taught in U.S. Pat. No. 5,611,682 (Slavejkov, et al.). The industrial furnace used for this test is similar to that depicted in FIG. 8, having four firing positions (left and right pairs of burners) and four flues. Raw material composition, furnace pull rate (rate of product removal from furnace), and burner natural gas and oxygen flows all remained essentially unchanged before and after installation of the burners of the present invention. Key operating parameters and results from the full furnace test are presented in Table 1.

TABLE 1

| Parameter | Change in Parameter During Full Furnace Test of Burners of Present Invention |
|---|---|
| Avg (calculated) Flame Momentum | Increase by 100% |
| Avg Oxygen Staging Level (% of total oxygen flow) | Increase from 5% to 70% |
| Avg Furnace Bottom Temperature | Increase by 16° F. |
| Product Yield | Increase by 5% (absolute) |
| NOx Emissions | Decrease by 14% |

Although illustrated, and described herein with reference to certain specific embodiments, the present invention is nevertheless not intended to be limited to the details shown. Rather, various modifications may be made in the details within the scope and range of equivalents of the claims and without departing from the spirit of the invention.

The invention claimed is:

1. A burner for combusting a fuel, comprising:
   a fuel conduit having a plurality of fuel sections, each fuel section being in fluid communication with each other fuel section and adapted to transmit a stream of the fuel, including
      a fuel inlet section having a first fuel inlet and a first fuel outlet spaced apart from the first fuel inlet, the fuel inlet section having a first cross sectional flow area and being adapted to transmit the stream of the fuel entering the first fuel inlet and exiting the first fuel outlet,
      a fuel transitional section having a fuel intake and a fuel outtake spaced apart from the fuel intake, the fuel transitional section adapted to transmit at least a portion of the stream of the fuel entering the fuel intake and exiting the fuel outtake, and having a second cross sectional flow area, the second cross sectional flow area varying from an initial cross sectional flow area at the fuel intake to a different cross sectional flow area at the fuel outtake, and
      a fuel outlet section having a second fuel inlet and a second fuel outlet spaced apart from the second fuel inlet, the fuel outlet section being adapted to transmit at least a portion of the stream of the fuel entering the second fuel inlet and exiting the second fuel outlet, and having a third cross sectional flow area, the third cross sectional flow area being substantially uniform throughout the fuel outlet section; and
   a first oxidant conduit having a plurality of oxidant sections, each oxidant section being in fluid communication with each other oxidant section and adapted to transmit a stream of an oxidant, including
      an oxidant inlet plenum being adapted to transmit a stream of the oxidant and having a fourth cross sectional flow area, at least a portion of the oxidant inlet plenum being spaced around substantially all of at least a portion of at least one of the fuel inlet section, the fuel transitional section, and the fuel outlet section, and
      an oxidant outlet section being adapted to transmit at least a portion of the stream of the oxidant and having a fifth cross sectional flow area, said fifth cross sectional flow area being less than or equal to the fourth cross sectional flow area and being substantially uniform throughout the oxidant outlet section, at least a portion of the oxidant outlet section being spaced around substantially all of at least a portion of the fuel outlet section.

2. A burner as in claim 1, further comprising:
   a second oxidant conduit adjacent the first oxidant conduit, the second oxidant conduit adapted to transmit another stream of the oxidant or a stream of another oxidant.

3. A burner as in claim 2, wherein the another stream of the oxidant or the stream of the another oxidant exiting the second oxidant conduit is at a location below a flame formed by combustion of the at least a portion of the stream of the fuel exiting the second fuel outlet of the fuel owlet section and the at least a portion of the stream of the oxidant exiting the oxidant outlet section.

4. The burner of claim 2, further an comprising an oxidant inlet manifold in fluid communication with the first oxidant conduit, and the second oxidant conduit.

5. The burner of claim 4, further comprising a staging valve for regulating a flow of the stream of oxidant to the second oxidant conduit.

6. A burner as in claim 1, further comprising a Y-shaped oxidant inlet conduit in fluid communication with the oxidant inlet plenum and adapted to feed the stream of the oxidant to the oxidant inlet plenum.

7. A burner as in claim 1, further comprising at least one guide vane disposed in the fuel transitional section, wherein the initial cross sectional flow area at the fuel intake of the fuel transitional section is smaller man the different cross sectional flow area at the fuel outtake of the fuel transitional section.

8. A burner as in claim 1, wherein a ratio of the fifth cross sectional flow area of the oxidant outlet section to the third cross sectional flow area of the fuel outlet section is less than a molar ratio of the oxidant to the fuel required for stoichiometric combustion.

9. The burner of claim 1, further comprising a longitudinal axis and a burner tip, said tip comprising
   a first elongated edge adjacent a flow of said stream of the fuel, and
   a second elongated edge adjacent a flow of said stream of said oxidant and forming a primary tip angle ($\alpha$) of less than about 15° from a line parallel to the longitudinal axis and intersecting an upstream surface parallel to the longitudinal axis,
   the first elongated edge and the second elongated edge forming a secondary tip angle ($\beta$) greater than the primary tip angle ($\alpha$) and less than about 90° from a line tangent to and extending from the first elongated edge in the direction of the flow of the fuel.

10. A burner as in claim 9, wherein the second elongated edge comprises
    an initial tapered section forming the primary tip angle ($\alpha$), and
    a curved section terminating at the first elongated edge.

11. The burner of claim 1, wherein said fifth cross-sectional flow area is less than said fourth cross-sectional flow area.

12. The burner of claim 1 wherein said cross-sectional flow area of said oxidant outlet section is substantially uniform and said cross-sectional flow area of said fuel outlet section is substantially uniform.

13. The burner of claim 12 further comprising locating pins to provide support between said fuel outlet section and the oxidant outlet section.

14. The burner of claim 1 wherein the cross-sectional flow are of the outtake of the fuel transition section is substantially non-circular and the cross-sectional flow area of the oxidant outlet section is substantially non-circular.

15. The burner of claim 1 further comprising an oxidant diffuser located upstream of said oxidant plenum.

16. The burner of claim 1 further comprising locating pins to provide support between said fuel outlet section and the oxidant outlet section.

17. A burner for combusting a fuel, comprising:
- a fuel conduit having a plurality of fuel sections, each fuel section being in fluid communication with each other fuel section and adapted to transmit a stream of the fuel, including
  - a fuel inlet section having a first fuel inlet and a first fuel outlet spaced apart from the first fuel inlet, the fuel inlet section having a first cross sectional flow area and being adapted to transmit the stream of the fuel entering the first fuel inlet and exiting the first fuel outlet,
  - a fuel transitional section having a fuel intake and a fuel outtake spaced apart from the fuel intake, the fuel transitional section adapted to transmit at least a portion of the stream of the fuel entering the fuel intake and exiting the fuel outtake, and having a second cross sectional flow area, the second cross sectional flow area varying from an initial cross sectional flow area at the fuel intake to a different cross sectional flow area at the fuel outtake, and
  - a fuel outlet section having a second fuel inlet and a second fuel outlet spaced apart from the second fuel inlet, the fuel outlet section being adapted to transmit at least a portion of the stream of the fuel entering the second fuel inlet and exiting the second fuel outlet, and having a third cross sectional flow area, the third cross sectional flow area being substantially uniform throughout the fuel outlet section;
- a first oxidant conduit having a plurality of oxidant sections, each oxidant section being in fluid communication with each other oxidant section and adapted to transmit a stream of an oxidant, including
  - an oxidant inlet plenum being adapted to transmit a stream of the oxidant, and having a fourth cross sectional flow area, at least a portion of the oxidant inlet. plenum being spaced around substantially all of at least a portion of at least one of the fuel inlet section, the fuel transitional section, and the fuel outlet section, and
  - an oxidant outlet section the oxidant outlet section being adapted to transmit at least a portion of the stream of the oxidant and having a fifth cross sectional flow area, said fifth cross sectional flow area being less man or equal to the fourth cross sectional flow area and being substantially uniform throughout the oxidant outlet section, at least a portion of the oxidant outlet section being spaced around substantially all of at least a portion of the fuel outlet section; and
- a second oxidant conduit adjacent the first oxidant conduit, the second oxidant conduit adapted to transmit another stream of the oxidant or a stream of another oxidant, wherein the another stream of the oxidant or the stream of the another oxidant exiting the second oxidant conduit is at a location below a flame formed by combustion of the at least a portion of the stream of the fuel exiting the second fuel outlet of the fuel outlet section and the at least a portion of the stream of the oxidant exiting the oxidant outlet section, and further comprising at least one guide vane disposed in the fuel transitional section, wherein the initial cross sectional flow are at the fuel intake of the fuel transitional section is smaller than the different cross sectional flow area at the fuel outtake of the fuel transitional section.

18. The burner of claim 17, further comprising an oxidant inlet manifold in fluid communication with the first oxidant conduit and the second oxidant conduit and further comprising a staging valve for regulating a flow of the stream of oxidant to the second oxidant conduit.

19. A method for combusting a fuel with an oxidant, comprising the steps of:
- providing a source of the fuel;
- providing a source of at least one oxidant;
- providing a burner, comprising
  - a fuel conduit having a plurality of fuel sections, each fuel section being in fluid communication with each other fuel section and adapted to transmit a stream of the fuel, including
    - a fuel inlet section having a first fuel inlet and a first fuel outlet spaced apart from the first fuel inlet, the fuel inlet section having a first cross sectional flow area and being adapted to transmit the stream of the fuel entering the first fuel inlet and exiting the first fuel outlet,
    - a fuel transitional section having a fuel intake and a fuel outtake spaced apart from the fuel intake, the fuel transitional section adapted to transmit at least a portion of the stream of the fuel entering the fuel intake and exiting the fuel outtake, and having a second cross sectional flow area, the second cross sectional flow area varying from an initial cross sectional flow area at the fuel intake to a different cross sectional flow area at the fuel outtake, and
    - a fuel outlet section having a second fuel inlet and a second fuel outlet spaced apart from the second fuel inlet, the fuel outlet section being adapted to transmit at least a portion of the stream of the fuel entering the second fuel inlet and exiting the second fuel outlet, and having a third cross sectional flow area, the third cross sectional flow area being substantially uniform throughout the fuel outlet section; and
  - a first oxidant conduit having a plurality of oxidant sections, each oxidant section being in fluid communication with each other oxidant section and adapted to transmit a stream of the oxidant, including
    - an oxidant inlet plenum being adapted to transmit a stream of the oxidant, and having a fourth cross sectional flow area, at least a portion of the oxidant inlet plenum being spaced around substantially all of at least a portion of at least one of the fuel inlet section, the fuel transitional section, and the fuel outlet section, and
    - an oxidant outlet section being adapted to transmit at least a portion of the stream of the oxidant, and having a fifth cross sectional flow area, said fifth cross sectional flow area being less than or equal to the fourth cross sectional flow area and being substantially uniform throughout the oxidant outlet section, at least a portion of the oxidant outlet section being spaced around substantially all of at least a portion of the fuel outlet section;

transmitting the stream of the fuel to the first fuel inlet, whereby at least a portion of the stream of the fuel is transmitted from the first fuel inlet to the second fuel outlet;

transmitting the stream of the oxidant to the oxidant plenum, whereby at least a portion of the stream of the oxidant is transmitted from the oxidant plenum to the oxidant outlet section; and combusting at least a portion of the fuel exiting the second fuel outlet with at least a portion of the oxidant exiting the oxidant outlet section.

20. A method as in claim 19, comprising the further steps of:

providing a second oxidant conduit adjacent the first oxidant conduit, adapted to transmit another stream of the oxidant or a stream of another oxidant entering the second oxidant conduit;

transmitting the another stream of the oxidant or the stream of the another oxidant to the second oxidant conduit; and combusting at least another portion of the fuel exiting the second fuel outlet with at least a portion of the another stream of the oxidant or at least a portion of the another oxidant exiting the second oxidant conduit.

21. A method as in claim 20, wherein the another stream of the oxidant or the stream of the another oxidant exiting the second oxidant outlet of the second oxidant conduit is at a location below a flame formed by combustion of the at least a portion of the stream of the fuel exiting the second fuel outlet of the fuel outlet section and the at least a portion of the stream of the oxidant exiting the oxidant outlet section.

22. A method as in claim 19, comprising the further steps of:

providing a Y-shaped oxidant inlet conduit in fluid communication with the oxidant inlet plenum and adapted to feed the stream of the oxidant to the oxidant inlet plenum; and feeding at least a portion of the oxidant to the Y-shaped oxidant inlet conduit.

23. A method as in claim 19, comprising the further step of providing at least one guide vane disposed in the fuel transitional section, wherein the initial cross sectional flow area at the fuel intake of the fuel transitional section is smaller than the different cross sectional flow area at the fuel outtake of the fuel transitional section.

24. A method as in claim 19, wherein a ratio of the fifth cross sectional flow area of the oxidant outlet section to the third cross sectional flow area of the fuel outlet section is less than a molar ratio of the oxidant to the fuel required for stoichiometric combustion.

25. The method of claim 19 further comprising the steps of:

providing the burner having a longitudinal axis and including a burner tip having a first elongated edge adjacent a flow of the stream of the fuel, and a second elongated edge adjacent a flow of the stream of an oxidant and forming a primary tip angle ($\alpha$) of less than about 15° from a line parallel to the longitudinal axis and intersecting an upstream surface parallel to the longitudinal axis, the first elongated edge and the second elongated edge forming a secondary tip angle ($\beta$) greater than the primary tip angle ($\alpha$) and less than about 90° from a line tangent to and extending from the first elongated edge in the direction of the flow of the fuel.

26. A method as in claim 25, wherein the second elongated edge comprises an initial tapered section forming the primary tip angle ($\alpha$), and a curved section terminating at the first elongated edge.

27. The method for combusting a fuel with an oxidant as in claim 19, further comprising the step of melting glass.

28. A method for combusting a fuel with an oxidant, comprising the steps of:

providing a source of the fuel;

providing a source of at least one oxidant;

providing a burner, comprising a fuel conduit having a plurality of fuel sections, each fuel section being in fluid communication with each other fuel section and adapted to transmit a stream of the fuel, including a fuel inlet section having a first fuel inlet and a first fuel outlet spaced apart from the first fuel inlet, the fuel inlet section having a first cross sectional flow area and being adapted to transmit the stream of the fuel entering the first fuel inlet and exiting the first fuel outlet, a fuel transitional section having a fuel intake and a fuel outtake spaced apart from the fuel intake, the fuel transitional section adapted to transmit at least a portion of the stream of the fuel entering the fuel intake and exiting the fuel outtake, and having a second cross sectional flow area, the second cross sectional flow area varying from an initial cross sectional flow area at the fuel intake to a different cross sectional flow area at the fuel outtake, said fuel transitional section comprising at least one guide vane, and a fuel outlet section having a second fuel inlet and a second fuel outlet spaced apart from the second fuel inlet, the fuel outlet section being adapted to transmit at least a portion of the stream of the fuel entering the second fuel inlet and exiting the second fuel outlet, and having a third cross sectional flow area, the third cross sectional flow area being substantially uniform throughout the fuel outlet section; and a first oxidant conduit having a plurality of oxidant sections, each oxidant section being in fluid communication with each other oxidant section and adapted to transmit a stream of the oxidant, including an oxidant inlet plenum being adapted to transmit a stream of the oxidant and having a fourth cross sectional flow area, at least a portion of the oxidant inlet plenum being spaced around substantially all of at least a portion of at least one of the fuel inlet section, the fuel transitional section, and the fuel outlet section, and an oxidant outlet section being adapted to transmit at least a portion of the stream of the oxidant, and having a fifth cross sectional flow area, said fifth cross sectional flow area being less than or equal to the fourth cross sectional flow area and being substantially uniform throughout the oxidant outlet section, at least a portion of the oxidant outlet section being spaced around substantially all of at least a portion of the fuel outlet section;

transmitting the stream of the fuel to the first fuel inlet, whereby at least a portion of the stream of the fuel is transmitted from the first fuel inlet to the second fuel outlet;

transmitting the stream of the oxidant to the oxidant plenum, whereby at least a portion of the stream of the oxidant is transmitted from the oxidant plenum to the oxidant outlet section;

combusting at least a portion of the fuel exiting the second fuel outlet with at least a portion of the oxidant exiting the oxidant outlet section;

providing a second oxidant conduit adjacent the first oxidant conduit, the second oxidant conduit adapted to transmit another stream of the oxidant or a stream of another oxidant entering the second oxidant conduit;

transmitting the another stream of the oxidant or the stream of the another oxidant to the second oxidant conduit, whereby at least a portion of the another stream of the oxidant or at least a portion of the another oxidant is transmitted from the second oxidant; and combusting at least another portion of the fuel exiting the second fuel outlet with at least a portion of the another stream of the oxidant or at least a portion of the another oxidant exiting the second oxidant conduit, wherein the another stream of the oxidant or the stream of the another oxidant exiting the second oxidant conduit is at a location below a flame formed by combustion of the at least a portion of the stream of the fuel exiting the second fuel outlet of the fuel outlet section and the at least a portion of the stream of the oxidant exiting the oxidant outlet section.

\* \* \* \* \*

UNITED STATES PATENT AND TRADEMARK OFFICE
CERTIFICATE OF CORRECTION

PATENT NO.        : 7,390,189 B2
APPLICATION NO.   : 10/919940
DATED             : June 24, 2008
INVENTOR(S)       : Mark Danial D'Agostini It is certified that error appears in the above-identified patent and that said Letters Patent is hereby corrected as shown below:

Column 14, Line 21

In claim 3 delete the word "owlet" and insert the word -- outlet --

Column 14, Line 24

In claim 4 delete the word "an" after the word further

Column 14, Line 38

In claim 7 delete the word "man" and insert the word -- than --

Column 15, Line 9

In claim 14 delete the word "are" and insert the word -- area --

Column 15, Line 9

In claim 14 insert the word -- fuel -- before the word "outtake"

Column 15, Line 60

In claim 17 delete the word "man" and insert the word -- than --

UNITED STATES PATENT AND TRADEMARK OFFICE
CERTIFICATE OF CORRECTION

PATENT NO. : 7,390,189 B2
APPLICATION NO. : 10/919940
DATED : June 24, 2008
INVENTOR(S) : Mark Danial D'Agostini It is certified that error appears in the above-identified patent and that said Letters Patent is hereby corrected as shown below:

Column 16, Line 9

In claim 17 delete the word "are" and insert the word -- area --

Signed and Sealed this

Nineteenth Day of August, 2008

JON W. DUDAS
*Director of the United States Patent and Trademark Office*